(12) United States Patent
Brandt et al.

(10) Patent No.: US 9,522,636 B2
(45) Date of Patent: Dec. 20, 2016

(54) MULTI-PART MOULDING STRIP

(75) Inventors: Olaf Brandt, Neuenrade (DE); Rafael Kunen, Plettenberg (DE)

(73) Assignee: DURA AUTOMOTIVE BODY AND GLASS SYSTEMS, GMBH, Köln (DE)

(*) Notice: Subject to any disclaimer, the term of this patent is extended or adjusted under 35 U.S.C. 154(b) by 98 days.

(21) Appl. No.: 13/288,553

(22) Filed: Nov. 3, 2011

(65) Prior Publication Data

US 2012/0137628 A1   Jun. 7, 2012

(30) Foreign Application Priority Data

Nov. 3, 2010   (EP) ..................................... 10189910

(51) Int. Cl.
*B60J 10/00* (2016.01)
*B60R 13/04* (2006.01)
*B60R 13/06* (2006.01)

(52) U.S. Cl.
CPC ................ *B60R 13/04* (2013.01); *B60J 10/00* (2013.01); *B60J 10/30* (2016.02); *B60J 10/45* (2016.02); *B60R 13/06* (2013.01)

(58) Field of Classification Search
CPC ..... B60J 10/02; B60J 10/0051; B60J 10/0062; B60J 10/0022; B60R 13/04; B60R 13/06
USPC ..... 52/716.5, 208, 204.53; 49/475.1; 296/93
See application file for complete search history.

(56) References Cited

U.S. PATENT DOCUMENTS

| | | | | |
|---|---|---|---|---|
| 3,752,521 A * | 8/1973 | Lafebre | ........................ | 293/128 |
| 3,895,468 A * | 7/1975 | Bernstein | ........................ | 52/222 |
| 3,897,967 A * | 8/1975 | Barenyi | ........................ | 293/120 |
| 4,066,285 A * | 1/1978 | Hall et al. | ..................... | 293/120 |
| 4,249,356 A * | 2/1981 | Noso | ............................. | 52/716.5 |
| 4,685,718 A * | 8/1987 | Steenblik et al. | ............. | 296/154 |
| 4,750,781 A * | 6/1988 | Betteridge | ..................... | 296/214 |
| 5,319,883 A * | 6/1994 | Gueneau et al. | ............ | 49/489.1 |
| 5,466,508 A * | 11/1995 | Brocke et al. | ................ | 428/122 |
| 5,732,509 A * | 3/1998 | Buehler et al. | .................. | 49/440 |
| 6,102,473 A * | 8/2000 | Steininger | ........... | B60R 13/0206 296/209 |
| 6,772,484 B2 * | 8/2004 | Miyano | ............... | B29C 45/4407 24/297 |
| 6,854,786 B2 * | 2/2005 | Berglund et al. | .......... | 296/146.9 |
| 6,910,722 B2 * | 6/2005 | Takeda | .................... | B60R 13/04 293/128 |
| 7,165,371 B2 * | 1/2007 | Yoyasu | ........................ | 52/716.5 |
| 7,344,331 B2 * | 3/2008 | Kobayashi | .............. | B60R 13/04 24/297 |
| 7,918,058 B2 * | 4/2011 | Debailleul et al. | ........ | 52/204.53 |

(Continued)

FOREIGN PATENT DOCUMENTS

DE   198 39 495 C1   11/1999
EP   0 431 964 A2   6/1991

(Continued)

*Primary Examiner* — Babajide Demuren

(74) *Attorney, Agent, or Firm* — Dinsmore & Shohl LLP

(57) ABSTRACT

The invention relates to the construction of a molding strip for a motor vehicle, which in addition to a basic strip comprises a sealing strip with a sealing lip. The sealing strip can be locked to the basic strip via corresponding counterparts provided on the basic strip. In order to ensure that the sealing strip is securely held on the basic strip, it is provided that the sealing strip comprises the connecting links of a material which compared with the material of the sealing lip is more structurally rigid.

14 Claims, 3 Drawing Sheets

(56) References Cited

U.S. PATENT DOCUMENTS

Figure 1:
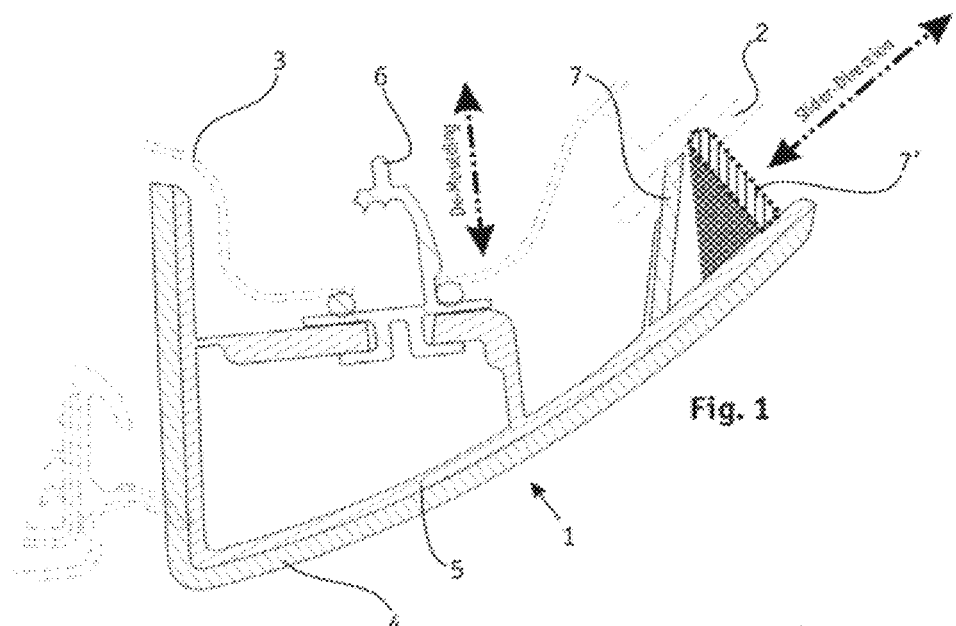

| | | | | |
|---|---|---|---|---|
| 7,980,613 | B2 * | 7/2011 | Murray | B60R 13/0206 |
| | | | | 296/1.08 |
| 8,465,082 | B2 * | 6/2013 | Lauderlein | B29C 45/14434 |
| | | | | 296/1.08 |
| 2002/0011040 | A1 * | 1/2002 | Adachi et al. | 52/204.597 |
| 2006/0154023 | A1 * | 7/2006 | Maki | 428/122 |
| 2009/0007498 | A1 | 1/2009 | Araki et al. | |
| 2009/0007511 | A1 * | 1/2009 | Hause | 52/312 |
| 2010/0102597 | A1 * | 4/2010 | Ellis | 296/201 |
| 2012/0110918 | A1 * | 5/2012 | Love | B60R 13/04 |
| | | | | 49/502 |
| 2013/0020822 | A1 * | 1/2013 | Inoue | B62D 35/007 |
| | | | | 296/1.08 |

FOREIGN PATENT DOCUMENTS

| | | | | |
|---|---|---|---|---|
| EP | 1 584 517 A2 | 10/2005 | | |
| FR | 2723898 A1 * | 3/1996 | | B60J 10/18 |
| FR | 2753415 B1 * | 11/1998 | | B60R 13/0206 |

\* cited by examiner

Detail A

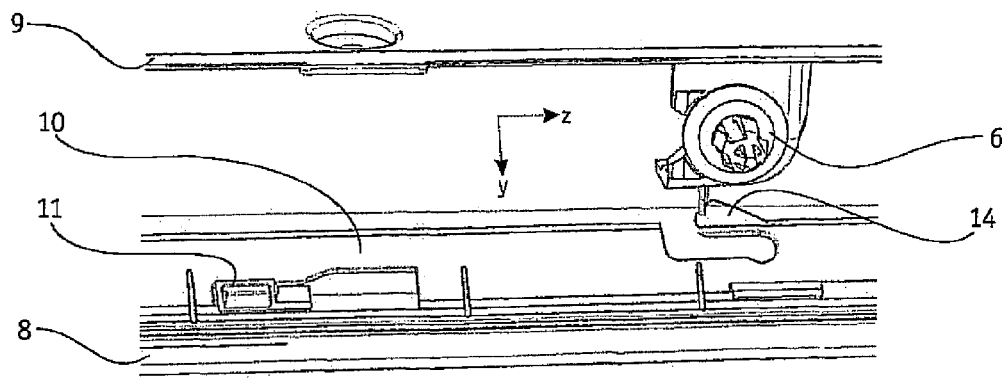
Fig. 6
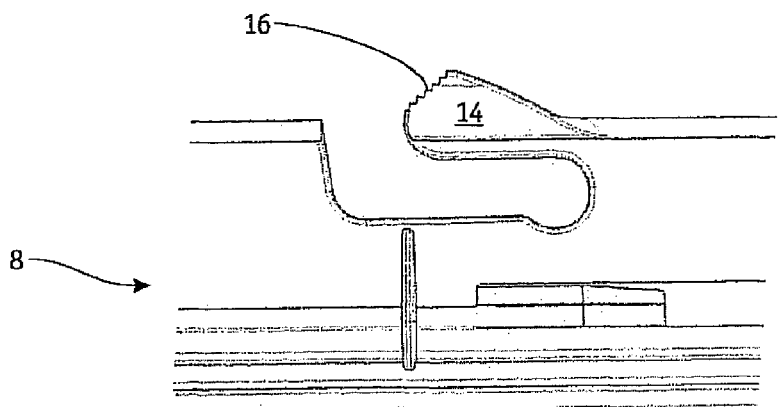
Fig. 7
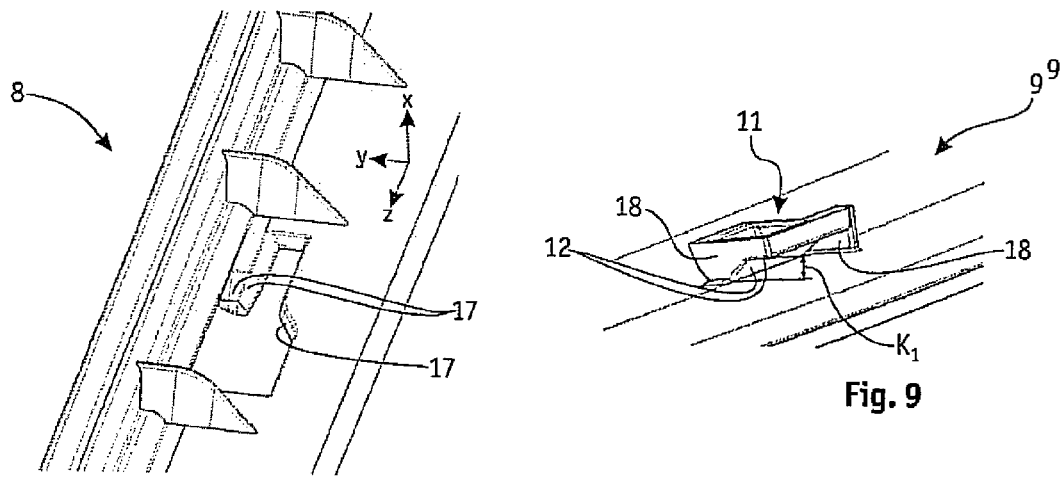
Fig. 8
Fig. 9

MULTI-PART MOULDING STRIP

CROSS-REFERENCE TO RELATED APPLICATIONS

This application claims priority of European Patent Application 10189910.2 filed Nov. 3, 2010.

The invention relates to the construction of a moulding strip, which serves as attachment part for a motor vehicle, wherein the moulding strip comprises a basic strip and a sealing strip attached or intentionally attachable to the basic strip, wherein the sealing strip comprises a sealing lip for sealing and/or visually bridging a gap developing between the moulding strip and an adjacent vehicle surface in the intentional installation state.

Moulding strips are employed on vehicle bodies as external design and function element. They serve to help configure the vehicle outside in that they visually and aerodynamically bridge gaps between body parts and a vehicle outer surface preferably without any fissures. In addition, they carry function parts such as seals.

From EP 1 584 517 A2 originating from the applicant herself a moulding strip is known, which in addition to a basic strip comprises a sealing strip. Connecting links provided on the sealing strip are engaged with receptacles provided on the basic strip so that the sealing strip following this is connected to the basic strip in a fixed manner for forming the moulding strip. Likewise from EP 1 584 517 A2 it is known that a sealing strip as soft plastic component is injection-moulded onto the basic strip in a multi-component injection moulding method. These methods for producing a sealing strip however have a series of disadvantages the rectification of which is seen as the object of the invention.

With a material-homogenous sealing strip of soft plastic, which as separate component following the injection moulding process of the basic strip is engaged with the latter, both the sealing strip itself as well as the engagement connection with the basic strip is within itself not very stiff and loadable. Tearing out of the sealing strip can easily occur. If one wishes not to engage or clamp the sealing strip to the basic strip but to glue, weld, rivet or screw these together for example, this is not possible as a rule or only with difficulty so. The mostly unsuitable material pairing of the sealing strip of soft plastic and the basic strip, which at least on the outside is produced from an impact-tough, scratch-insensitive plastic regularly does not allow a material connection to be subsequently produced. Subsequent screwing or riveting proves to be difficult because the soft plastic of the sealing strip is unable to absorb the high clamping forces which are required for such a connection to last in the long term. If at all, such connections are practically possible between basic strip and sealing strip only with the help of additional, elaborate operations or additional components. However, both are to be avoided for a lean manufacturing process if possible. An object of the invention therefore is to have available a moulding strip as combination of sealing strip and basic strip which creates a wider spectrum of connecting possibilities that are simple to realize and adequately loadable. If the sealing strip is injection moulded directly onto the basic strip which usually already has a first and a second plastic component by the multi-component injection moulding method, a three-component injection moulding plant is required. This is substantially more expensive than a two-component plant. For any design changes to be possibly carried out on the sealing lip or on the basic part it is disadvantageous that such a design change can have an influence on all tools used in the three-component plant, so that all tools of the three-component plant have to be reworked or exchanged, even if the design change ultimately concerns only one of the components. A further object of the invention therefore consists in making available an assembly of basic strip and sealing strip for which a three-component injection moulding plant is not required and with which changes to one of the components or the tool provided for this purpose will not require any changes to the respective other component or the tool provided for this purpose to be made. In the result, time and costs can be saved with design changes.

A further disadvantage of the multi-component injection moulding technology is that with the design configuration of the overall component, the injection moulding process for the overall component always has to be taken into account even with respect to its individual components injection-moulded from different materials. Thus, a sealing lip cannot always be injection-moulded to the basic part in optimal alignment because this alignment is not compatible with the main de-moulding direction required for the overall part, but would mean undercuts in the tool that cannot be tolerated. A further aspect relates to the material selection, since with multi-component injection moulding only compatible materials, which can also be materially joined during the injection moulding process are naturally possible. In addition, it can also be of interest to produce the basic part from a material that is not injection-mouldable in the first place, for example as high-quality aluminium or stainless steel strip. A further object of the invention therefore is to provide a moulding strip design which allows the designer greater design freedom particularly with the spatial-three dimensional configuration and with the material selection.

Additionally advantageous would be a moulding strip design, wherein the sealing strip as additional part to be mounted onto the basic strip could be easily replaced. On the one hand, this would make it possible to replace a defective strip part without also having to replace the other at the same time. On the other hand, the same basic strip or the same sealing strip could thus be made use of for different vehicle models, even if another sealing strip or another basic part would be required for the respective vehicle model. Particularly for the sealing strip it would be desirable to be able to employ said sealing strip irrespective of vehicle model and to be able to realize a different orientation that may be required with different vehicle models by means of design measures on the basic part. A further object of the invention thus consists in creating a moulding strip design wherein the sealing strip and/or the basic strip can be employed as standard part across vehicle models.

According to the invention, these objects are solved in that the sealing strip comprises one or a plurality of connecting links of a material that is more structurally rigid relative to the material of the sealing lip and the sealing strip, as component that is separate or separable from the basic strip can be connected to the basic strip by means of the connecting links via corresponding counterparts located on the basic strip.

This configuration makes it possible that the part of the sealing strip that forms the connecting link, with which the sealing strip is fastened to the basic strip, has material properties which are more suitable than the soft plastic required for the sealing lip. Provided that on the basic strip counterparts that are compatible with the connecting links are present, the sealing strip can thus be fastened to the basic strip regardless of the material selection made. With regard to the selection of the fastening means, with which the sealing strip can be locked onto the basic strip, there are hardly any limits facing the designer.

Here, the term "more structurally rigid" is to be particularly understood such that it concerns a material with greater strength. In particular, this property can be also achieved with plastics in that although the same basic material, particularly the same plastic type as for the sealing lip is used, another composition is utilized, which for example has a smaller softener component.

It is to be considered advantageous if the material of the sealing lip is injection-moulded onto the material of the connecting links. Thus, sealing lip and connecting links form an inseparable material bond with which the connecting links are inseparably imbedded in the material of the sealing lip. Here, the connecting links can be placed into the injection moulding tool prior to the actual injection moulding process. However, preferably, the sealing lip is produced by the multi-component injection moulding method, wherein after the injection moulding operation for the injection links the sealing lip material is injection-moulded onto the material of the connecting links without prior demoulding of the connecting links.

For fixing the sealing strip to the basic strip the sealing strip has a plurality of connecting links which interact with compatible counterparts present on the basic strip. The pairing of connecting links and corresponding counterparts is preferably configured in such a manner that the sealing lip is initially placed onto the basic strip in a placement movement that is substantially perpendicular to the inner surface of the basic strip facing inside in the intentional installation state and subsequently engages with the basic strip through a sliding movement directed parallel to said inner side, so that the sealing strip is spatially fixed relative to the basic strip. The assembly movement is thus preferably composed of a combination of placement and sliding movement.

On the sealing strip, different types of connecting links can be provided, which interact with different types of corresponding counterparts on the basic strip each matched to the respective connecting link. Obviously, it is also possible that all connecting elements provided on the sealing strip just like the corresponding counterparts on the basic strip are of the same type.

The spatial fixing of the sealing strip on the basic strip in x, y and z-direction is realized via one or a plurality of different stops on the connecting links and the counterparts. The stops form stop points or stop surfaces on which connecting links and counterparts meet each other as limitation of the assembly movement. For the spatial fixing of the sealing strip on the basic strip a single stop per direction and sealing strip is basically enough, while preferably a plurality of stops is provided, however.

In order to permanently hold the sealing strip in the position defined by the stops at least one engagement link is preferably provided on the sealing strip and/or the basic strip. During the placement movement and/or the pushing movement, the engagement link is initially compressed in order to subsequently engage positively in a resilient manner behind a component of the respective other moulding strip part for the spatial fixing of the sealing strip on the basic strip. A subsequent non-destructive removal of the sealing strip from the basic strip is then possible only with the simultaneous actuation of the engagement link.

In order to permanently hold the basic strip free of play on the basic strip it is provided that the sealing strip with proper assembly is permanently set against the inner surface of the basic strip by means of a clamping force. To this end, the sealing strip is braced between the stops of the basic strip, which counteract a lifting-off of the sealing strip from the basic strip and the basic strip inner surface. The bracing is preferably achieved in that the clamping width of the counterparts on the basic strip is slightly smaller than the clamping width of the connecting links on the sealing strip. The distance of the stop surfaces or stop points provided on the sealing strip, which for avoiding a lifting-off are engaged over by the counterparts provided on the basic strip, to the contact points, which following the assembly come to bear against the inside of the basic strip is thus slightly larger than the distance between the inner surface of the basic strip and the stops of the counterparts counteracting a lifting-off if the sealing strip is not placed. For this purpose, elevations can be provided especially on the side of the sealing strip which upon intentional assembly faces the inner surface of the basic strip, which elevations during the placement movement and/or the subsequent sliding-on movement allow compression of the sections of the sealing strip provided with connecting links or the connecting links themselves.

In order to facilitate the assembly movement, particularly the sliding-on movement and in order to prevent canting or hooking-up of the sealing strip, at least a part of the connecting links and/or at least a part of the corresponding counterparts comprise assembly bevels, which take care of a gradual inter-engagement of the connecting links and the respective associated counterparts. Thus, the placement movement can still be carried out relatively roughly and the alignment and the bracing of the sealing strip takes place guided by the assembly bevels during the sliding-on movement.

Further features and advantageous of the invention are obtained from the subclaims and from the following description of preferred exemplary embodiments by means of the drawings.

In the drawings it shows

Figure 2:
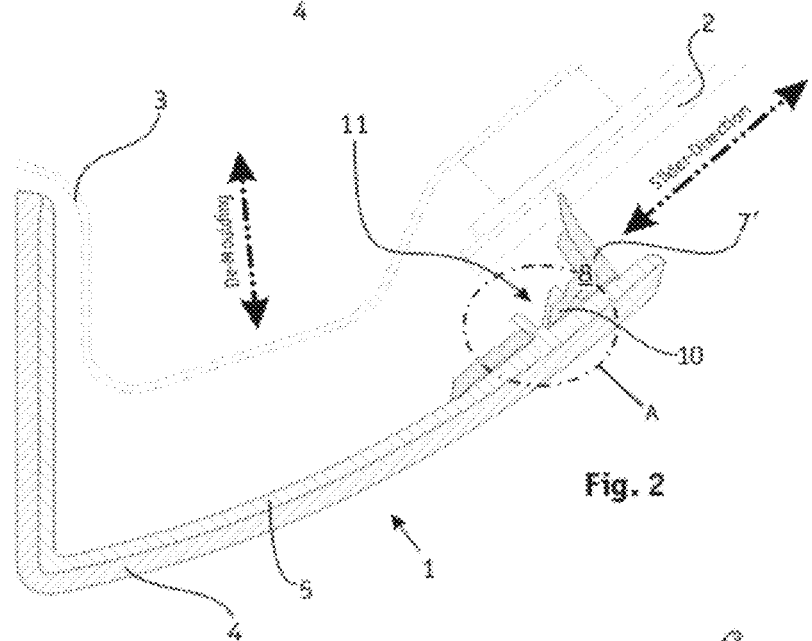
Figure 3:
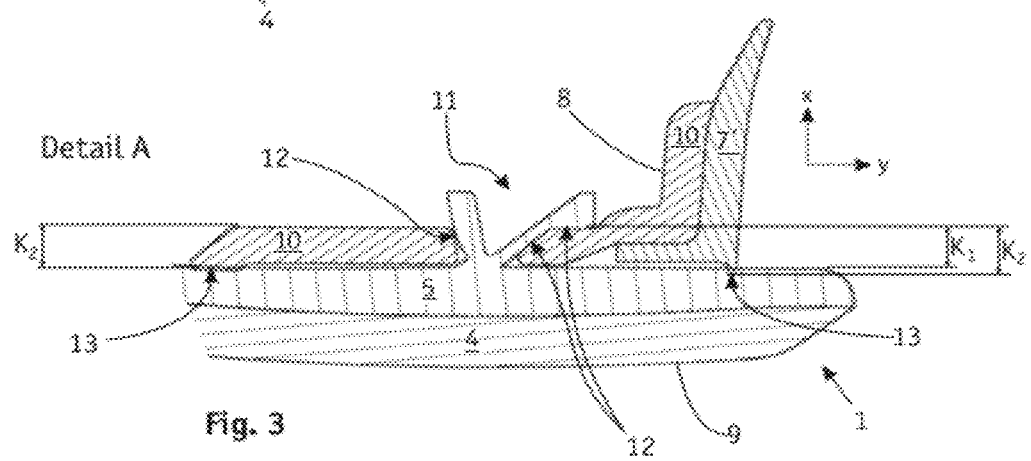
Figure 4:
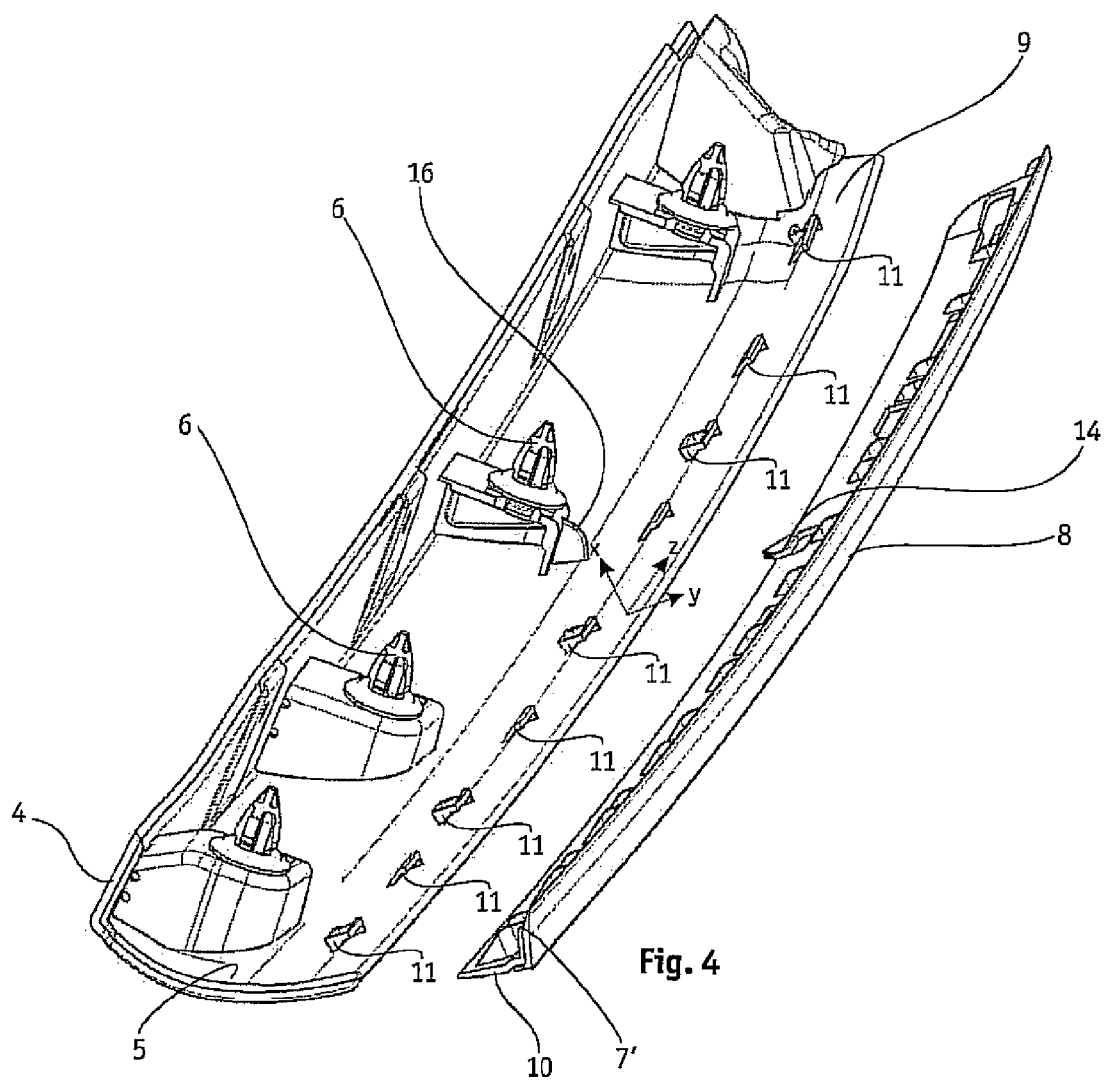
Figure 5:
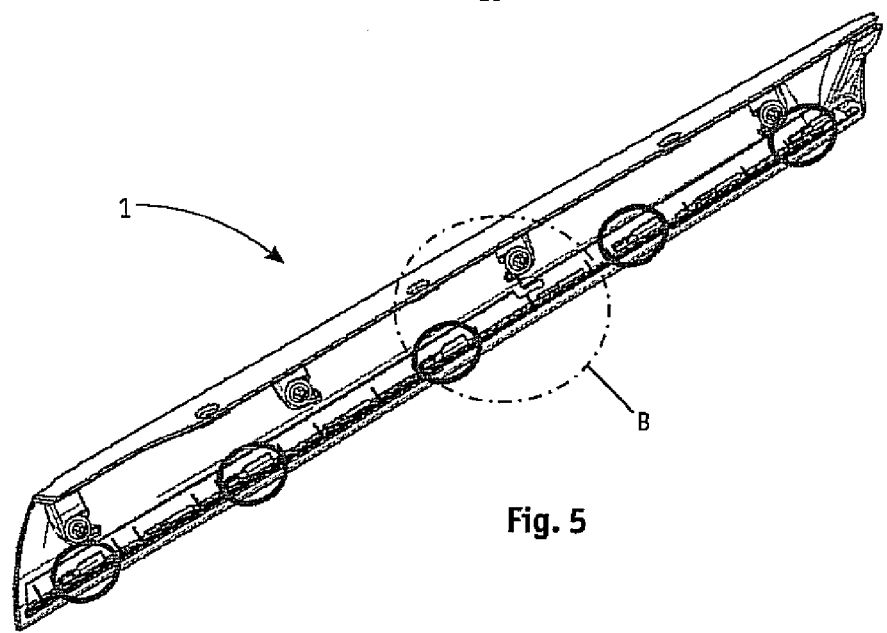

FIG. 1 a cross section of a configuration of a moulding strip not belonging to the invention, which is produced by a free component injection moulding method, FIG. 2 a cross section of a moulding strip according to the invention, FIG. 3 detail A from FIG. 2, FIG. 4 the moulding strip from FIG. 4 with a sealing strip not yet mounted on a basic strip, and FIG. 5 the moulding strip from FIG. 3 with the sealing strip mounted onto the basic strip, FIG. 6 detail B from FIG. 5, FIG. 7 a securing element for locking the sealing strip in detail, FIG. 8 a connecting link of the sealing strip from the FIGS. 4 to 6, in detail, and FIG. 9 a counterpart corresponding to the connecting link from FIG. 8 on the basic strip.

For the purpose of illustrating the invention, a moulding strip 1 that does not belong to the invention is shown in FIG. 1. The moulding strip in this case exemplarily shown as cover strip, which covers the gap between the windshield 2 and the body frame 3 of a motor vehicle.

The moulding strip 1 is produced from a total of three plastic components in by a multi-component injection moulding method. A first, rather brittle, impact-tough and scratch-proof plastic forms a strip-shaped decorative part 4 or a decorative layer 4 which in the intentional installation state on the vehicle is directed to the outside. The decorative part 4 is injection-moulded from the outside against a likewise strip-shaped carrier part 5 of a second plastic, which because of its rather ductile and non-breakable material properties assumes functional tasks such as receiving fastening elements 6 or the elastic supporting of sealing elements 7. For forming the soft-elastic in this case likewise strip-shaped sealing element 7, which following intentional installation is to elastically hug the windshield 2, a third plastic is injection-moulded against the carrier part 5.

In FIG. 1, in addition to the actual moulding strip 1, the main demoulding direction, in which the injection moulding tool (not shown) and moulding strip 1 are separated from each other during the demoulding operation, and the slide direction of the slide (not shown), by means of which a further cavity for the first plastic forming the sealing element 7 is created, are drawn in.

The alignment of the sealing element 7 to the windshield 2 is decisively determined by the demoulding direction. The alternative sealing element 7' which is graphically and actually not present placed above the moulding strip 1, drawn in bordered by an interrupted line illustrates an alignment of such a sealing element that is preferred relative to the alignment of the sealing element 7 actually present, wherein the sealing element could be set against the windshield 2 more steeply and with greater force. Because of the undercut (graphically illustrated by the cross-hatched area) which is created with this alignment with respect to the main demoulding direction, this preferred alignment cannot be realized or only very inconveniently so.

FIG. 2 shows a modified embodiment of the moulding strip 1 from FIG. 1 belonging to the invention. In order to nevertheless make possible the desired alignment of the sealing element 7' and simultaneously provide a permanent connection between the carrier part 5 of the moulding strip 1 and the sealing element 7' it is provided to form the sealing element 7' as part of a sealing strip 8, which is a component that is separate from a basic strip 9 and can be mounted onto the basic strip 9. Basic strip 9 and sealing strip 8 then together form the moulding strip 1, which in FIG. 1 was still present as unitary total component altogether produced by the multi-component injection moulding method. The sealing strip 8 can be mounted onto the basic strip 9, particularly fitted without tools and is securely held on the basic strip 9 via its connecting links 10, which interact with corresponding counterparts 11 on the basic strip 9.

The sealing strip 8 and the basic strip 9 in the example shown in FIG. 2 are both produced by the two-component injection moulding method. The plastic material that is used for producing the connecting links 10 of the sealing strip 8 need not be a soft-elastic material like the sealing element 7' itself, but can have properties that are particularly suited for the connection and the interaction with the basic strip 9. By contrast, the sealing element 7' itself can indeed be produced from a soft-elastic material, for example from a thermoplastic elastomer, which is well suited for the tasks to be assumed by the sealing element 7', but would not satisfy the requirements that would be made on the material of the connecting links 10. Added to this is that through the material-based separation of sealing strip 8 and basic strip 9 material pairings can also be employed, which could not otherwise be utilized easily.

An advantage of the embodiment shown in FIG. 2 additionally is that an angle or contour change of the sealing element 7', particularly a change of the sealing lip, can be implemented more easily if the sealing element 7' is part of a sealing strip B that is separated from the basic part 9. In the three-component tool, which is required for producing the embodiment shown in FIG. 1, the cross-sectional contour by contrast is substantially dependent on the main demoulding direction. Added to this is that the sealing lip 8 can be employed largely universally, particularly model-independently, since it can be fitted onto a wide range of basic strips.

FIG. 3 shows detail A from FIG. 2. It is evident how the counterpart 11 material-unitarily arranged on the basic strip 9 engages over the connecting link 10 forming a part of the sealing strip 8. The connecting link 10 and with it the entire sealing strip 8 is fixed both in x as well as in y-direction and aligned relative to the basic part 9 via different stops 12, which form bearing surfaces or bearing points on which the two components bear against each other. On the sealing strip 8, elevations 13 in form of slightly opened-out surface regions or small continuations are provided, which increase the clamping width $K_2$ on the sealing strip and ensure that the sealing strip 8 is permanently braced elastically between the stops 12 and the basic strip inner side, the spacing of which relative to each other is represented by the clamping width $K_2$. Relative movements between basic strip 9 and sealing strip 8 are thus securely and permanently avoided. Rattling noises or even a detaching of the sealing strip 8 from the basic strip 9 are excluded.

FIG. 4 and FIG. 5 show the basic strip 9 and the sealing strip 8 before the mounting (FIG. 4) or after the mounting (FIG. 5) of the sealing strip B in a total view. Especially in FIG. 4, the counterparts 11 corresponding to the connecting links 10 are evident on the inner side of the basic strip 9. In the case of the basic strip 9 shown in FIG. 4 a multiplicity of counterparts 11 are provided, which following the mounting of the sealing strip 8 engage over its connecting links 10 in a clamping manner in order to fix the sealing strip to the basic strip particularly in x and y-direction.

FIG. 4 and FIG. 5 additionally show a securing element 14, via which the sealing strip 8 is held on the basic part 9 in z-direction. The securing element 14 is formed by a resiliently mounted engagement link, which during the assembly of the sealing strip 8 on the basic part is initially compressed in order to subsequently engage behind an engagement protrusion 15 on the basic strip 9 in a resilient manner. The engagement protrusion 15 in this case is exemplarily formed by a stiffening rib provided on the inner side of the basic strip.

For mounting the sealing strip 8 on the basic strip 9 the connecting links 10 of the sealing strip 8 or the receptacles provided therein are brought into alignment with the corresponding counterparts 11 provided on the basic strip 11. Following this, the sealing strip 8 is pressed on slightly in negative x-direction and placed onto the basic strip 8 in order to be subsequently displaced in positive z-direction until the connecting links 10 with z-stops 18 come to bear against the basic strip and the securing element 14 secures against a displacement in negative z-direction through engagement with the basic strip 9.

FIG. 6 shows detail B from FIG. 5. It is evident how a connecting link 10 inter-engages with a corresponding counterpart 11 and how the securing element 14 positively engages behind an engagement protrusion 15, in this case exemplarily a reinforcing rib.

FIG. 7 illustrates in detail a possible embodiment of the securing element 14. On the engagement edge 16 facing the engagement protrusion 15 in the intentional installation state it is formed step-like. The unsteady edge course ensures that the edge 16 can securely and without play engage behind the engagement protrusion 15 because of the multiplicity of the potentially possible abutment surfaces in different angular positions, so that the sealing strip 8 is held without play regardless of how far it can be pushed onto the basic strip 9 in positive z-direction. Thus, engagement without play is always guaranteed, even when the exact position which the components ultimately assume relative to each other cannot be absolutely determined in advance because of material elasticities, unavoidable tolerances between the components and because of manufacturing inaccuracies.

FIG. 8 shows the mounting formed by a connecting element 10 for the corresponding counterparts, which on the side of the edge and in a region leading in positive z-direction during the sliding-on movement comprises conically tapering mounting bevels 17. This makes possible in particular a simple threading and an alignment of the sealing strip that is substantially automatic as part of the sliding-on movement. Through their inclined position, the mounting bevels 17 additionally set the sealing strip 8 increasingly against the inner surface of the basic strip during the sliding-on movement.

FIG. 9 shows a counterpart 11 corresponding to the connecting element 10 shown in FIG. 8 in detail. The clamping width $K_1$ on the counterpart is slightly smaller than the clamping width or material thickness $K_2$ on the sealing strip, as shown in FIG. 3. The counterpart 11 shown in FIG. 9 additionally shows a z-stop 18, i.e. a stop surface which limits the sliding-on movement of the sealing strip in positive z-direction.

LIST OF REFERENCE CHARACTERS

1 Moulding strip
2 Windshield
3 Body frame
4 Decorative part
5 Carrier part
6 Fastening element
7, 7' Sealing element
8 Sealing strip
9 Basic strip
10 Connecting links
11 Counterparts
12 Stops
13 Elevations
14 Securing element
15 Engagement protrusion
16 Engagement edge
17 Mounting bevels
18 z-stop
$K_1$ Clamping width on the counterparts
$K_2$ Clamping width on the connecting link

The invention claimed is:

1. A moulding strip assembly serving as an attachment part for a motor vehicle, wherein the moulding strip assembly comprises:
   a basic strip including a plastic carrier having pillar fastening elements attaching the moulding strip to a vehicle frame said basic strip including a decorative plastic part formed on the plastic carrier and having a plurality of counterparts, the counterparts being distinct from the fastening elements;
   a single plastic sealing strip independent and discrete from the basic strip, the sealing strip including a sealing lip and a plurality of connecting links,
   the sealing lip extending a distance from the basic strip to visually bridge a gap between the basic strip and an adjacent vehicle surface, wherein the connecting links are structurally stiffer compared with the sealing lip and wherein the sealing strip includes a separated state from the basic strip and a connected state to the basic strip, wherein in the connected state the plurality of connecting links engage the plastic carrier via the plurality of counterparts thereby securing the single sealing strip to the basic strip.

2. The moulding strip assembly according to claim 1, wherein the material of the sealing lip is injection-moulded onto the material of the connecting links.

3. The moulding strip assembly according to claim 1, wherein the sealing strip is produced by multi-component injection moulding.

4. The moulding strip assembly according to claim 1, wherein the pairing of connecting links and plastic carrier is configured in such a manner that the sealing strip is to be initially placed onto the basic strip in a placement movement initially directed substantially perpendicularly to an inner surface of the basic strip and subsequently engages the basic strip through a sliding movement directed parallel to said inner side in order to fix the sealing strip relative to the basic strip.

5. The moulding strip assembly according to claim 1, wherein on the sealing strip and on the basic strip one or a plurality of stops is provided, which stops form stop points or stop surfaces on which connecting links and plastic carrier meet one another as limitation of a mounting movement in order to establish the alignment of the sealing strip on the basic strip.

6. The moulding strip assembly according to claim 1, wherein at least one securing element is provided on the sealing strip and/or the basic strip which as part of a mounting movement is initially compressed in order to subsequently positively engage behind a component of the respective other moulding strip part in a resilient manner.

7. The moulding strip assembly according to claim 1, wherein in the connected state the sealing strip is permanently set against the inner surface of the basic strip.

8. The moulding strip assembly according to claim 1, wherein a clamping width $K_1$ of the plastic carrier on the basic strip is smaller than a clamping width $K_2$ of the connecting links on the sealing strip.

9. The moulding strip assembly according to claim 1, wherein on the side of the sealing strip facing an inner surface of the basic strip elevations are provided which, during placement movement and/or subsequent sliding-on movement make possible a compression of the sections of the sealing strip provided with connecting links and/or of the connecting links themselves for generating a clamping effect between basic strip and sealing strip.

10. The moulding strip assembly according to claim 1, wherein at least one part of the connecting links or plastic carrier includes mounting bevels.

11. The moulding strip assembly according to claim 1, wherein the pairing of connecting links and the plastic carrier is configured such that the sealing strip is displaced relative to the basic strip by a sliding movement in a longitudinal direction parallel to the basic strip in order to establish a fixed alignment of the sealing strip on the basic strip wherein at least one securing element is provided on the sealing strip allowing sliding movement in a direction corresponding to the connected state and prevents movement in an opposing direction.

12. A molding strip assembly according to claim 1 wherein in the connected state the plurality of connecting links include stops that bear against the plurality of counterparts and define a limit of sliding movement of the sealing strip relative to the basic strip.

13. A molding strip assembly according to claim 1 wherein in the connected state the plurality of connecting links engage the plastic carrier via the plurality of counterparts and the sealing strip is set against an inner surface of the basic strip.

14. A moulding strip assembly serving as an attachment part for a motor vehicle, wherein the moulding strip assembly comprises:
- a basic strip including a plastic carrier having pillar fastening elements attaching the moulding strip to a vehicle frame said basic strip including a decorative plastic part formed on the plastic carrier and having a plurality of counterparts, the counterparts being distinct from the fastening elements;
- a single plastic sealing strip independent and discrete from the basic strip, the sealing strip including a sealing lip and a plurality of connecting links,
- the sealing lip extending a distance from the basic strip to visually bridge a gap between the basic strip and an adjacent vehicle surface, wherein the connecting links are structurally stiffer compared with the sealing lip and wherein the sealing strip includes a separated state from the basic strip and a connected state to the basic strip, wherein in the connected state the plurality of connecting links engage the plastic carrier via the plurality of counterparts thereby securing the single sealing strip to the basic strip and wherein the basic strip includes a basic strip length and the sealing strip includes a sealing strip length wherein in the connected state the basic strip and sealing strip overlap along the respective basic strip length and sealing strip length.

* * * * *